US006260080B1

(12) United States Patent
Kim

(10) Patent No.: US 6,260,080 B1
(45) Date of Patent: Jul. 10, 2001

(54) SYSTEM FOR IMPROVING SIGNAL QUALITY BETWEEN CPU AND FLOPPY DISK DRIVE IN NOTEBOOK COMPUTER UTILIZING PULL-UP DEVICE DISPOSED BETWEEN TERMINALS CONNECTED TO CONTROL SIGNALS AND ONE OF POWER SUPPLY POTENTIALS

(75) Inventor: Sun-kuil Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/170,110

(22) Filed: Oct. 13, 1998

(30) Foreign Application Priority Data

Oct. 14, 1997 (KR) .................................................. 97-52637

(51) Int. Cl.[7] .............................. G06F 13/14; G06F 13/20
(52) U.S. Cl. ................................ 710/11; 710/29; 710/52; 710/125; 712/248
(58) Field of Search .................................. 710/11, 125, 3, 710/8, 29, 52; 712/248

(56) References Cited

U.S. PATENT DOCUMENTS

| 5,239,559 | 8/1993 | Brach et al. . | |
| 5,313,595 | 5/1994 | Lewis et al. . | |
| 5,399,926 | 3/1995 | Adams et al. . | |
| 5,422,580 | 6/1995 | Mandel et al. . | |
| 5,454,080 | * 9/1995 | Fasig et al. ........................ | 395/283 |
| 5,528,167 | 6/1996 | Samela et al. . | |
| 5,553,250 | 9/1996 | Miyagawa et al. . | |
| 5,578,940 | 11/1996 | Dillon et al. . | |
| 5,594,370 | 1/1997 | Nguyen et al. . | |
| 5,594,873 | * 1/1997 | Garrett ............................... | 395/281 |
| 5,650,910 | * 7/1997 | Winick et al. ...................... | 361/683 |
| 5,781,028 | 7/1998 | Decuir . | |
| 5,781,029 | 7/1998 | Baran . | |
| 5,802,390 | 9/1998 | Kashiwagi et al. . | |
| 5,877,634 | * 3/1999 | Hunley ............................... | 326/83 |

FOREIGN PATENT DOCUMENTS 93-15880   7/1993  (KR) .

* cited by examiner

Primary Examiner—Thomas Lee
Assistant Examiner—Rehana Penveen
(74) Attorney, Agent, or Firm—Robert E. Bushnell, Esq.

(57) ABSTRACT

A notebook computer for stably operating a floppy disk drive, includes: a floppy disk drive for writing or reading information to or from a floppy disk according to predetermined control signals; a motherboard having a controller generating control signals for controlling reading and writing data from and to the floppy disk drive, the controller being mounted on the motherboard, the floppy disk drive driving the floppy disk according to the control signals transmitted from the controller; and a connection unit for transmitting the control signals and power supply potentials from the controller to the floppy disk drive, the connection unit being physically and electrically disposed between the motherboard and the floppy disk drive. The connection unit includes a pull-up device disposed between terminals connected to the control signals and one of the power supply potentials. The pull-up device is connected to a signal line between the controller and the floppy disk drive, to thereby increase a noise margin of the control signal and to provide sufficient current flow to the drive. Accordingly, signals generated by the controller for controlling the drive are transmitted to the floppy disk drive without noise, and thus the floppy disk drive can stably operate.

17 Claims, 9 Drawing Sheets

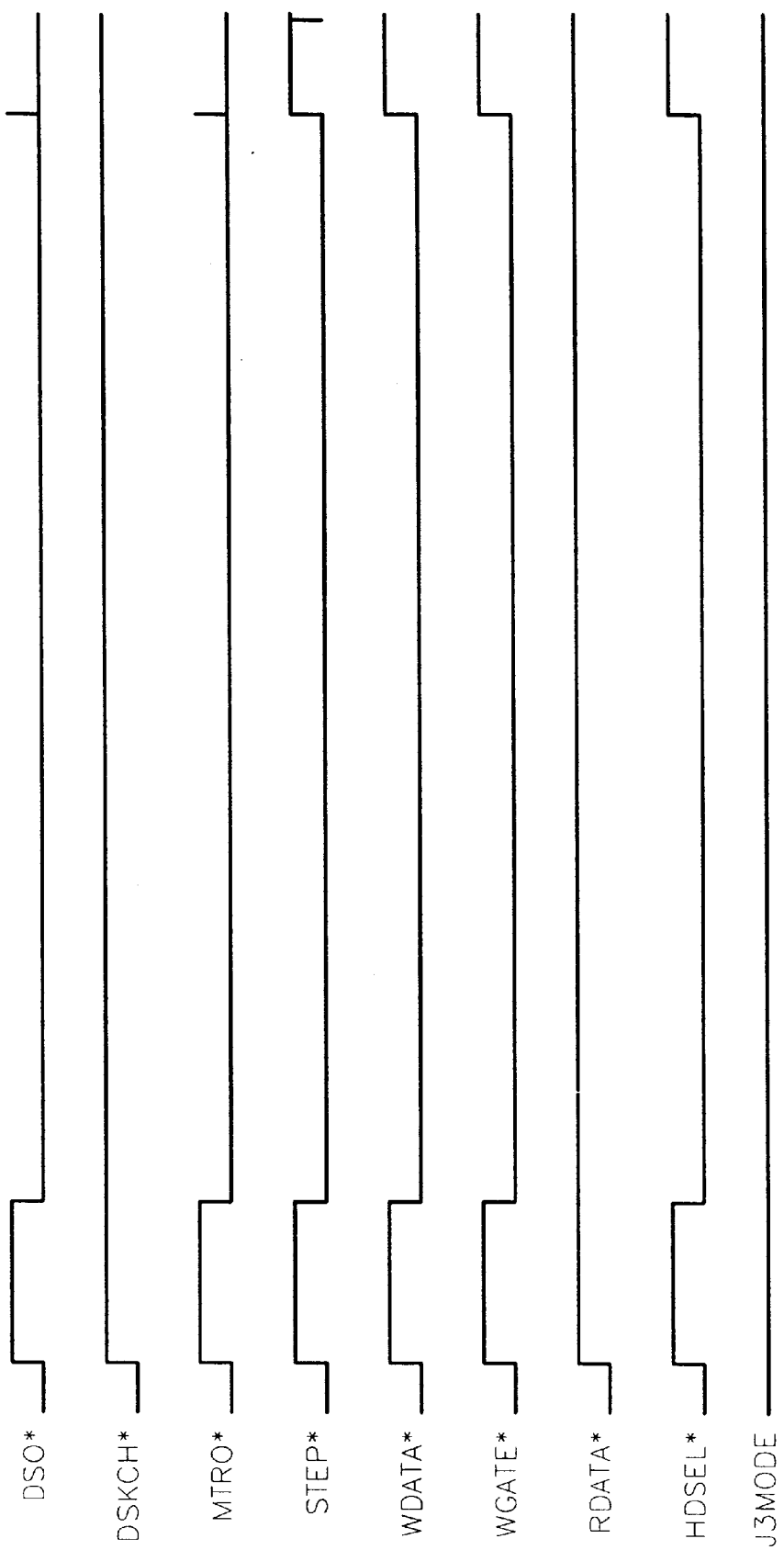

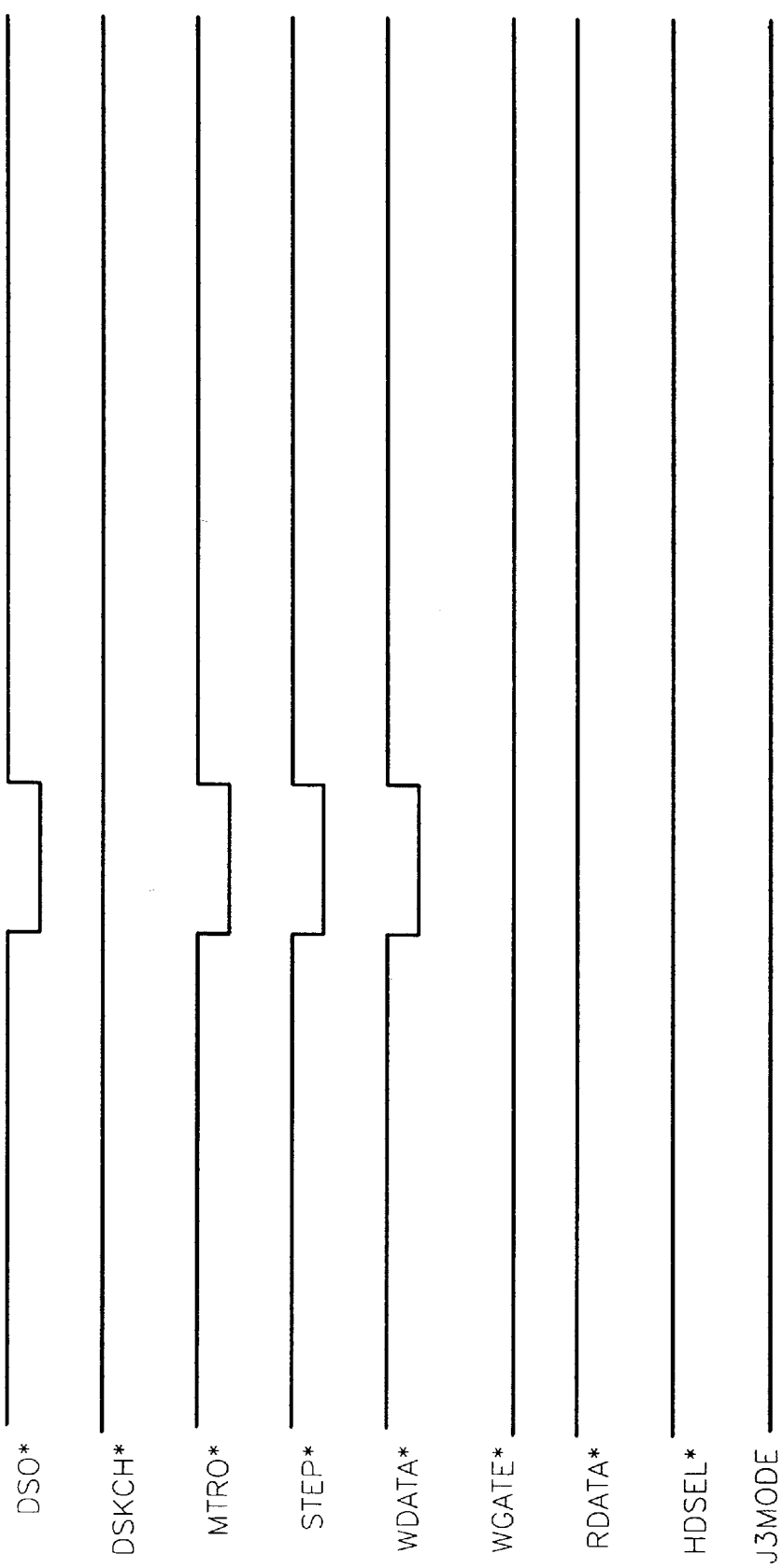

SYSTEM FOR IMPROVING SIGNAL QUALITY BETWEEN CPU AND FLOPPY DISK DRIVE IN NOTEBOOK COMPUTER UTILIZING PULL-UP DEVICE DISPOSED BETWEEN TERMINALS CONNECTED TO CONTROL SIGNALS AND ONE OF POWER SUPPLY POTENTIALS

CLAIM OF PRIORITY

This application makes reference to, incorporates the same herein, and claims all benefits accruing under 35 U.S.C. §119 from an application for NOTEBOOK COMPUTER HAVING FLOPPY DISK DRIVE earlier filed in the Korean Industrial Property Office on Oct. 14, 1997 and there duly assigned Ser. No. 52637/1997.

BACKGROUND OF THE INVENTION

1. Field of the Invention

The present invention relates to a notebook computer having a floppy disk drive for writing and reading information to and from a floppy disk according to a control signal, and more particularly, to a notebook computer for stably operating a floppy disk driver.

2. Description of the Related Art

In general, a notebook computer includes a latch, a touch pad mouse, a power supply indicator, a Num Lock key indicator, a Caps Lock key indicator, a Scroll Lock key indicator, an indicator for indicating the operation of a hard disk drive or a floppy disk drive, a battery charge indicator, and a slot in which a floppy disk is inserted.

The structure of the inner body of a notebook computer includes a floppy disk drive a motherboard on which a processor and a memory are mounted. The floppy disk drive and the motherboard are connected via connector to communicate signals between the drive and the controller.

The floppy disk drive for reading and writing information to and from the diskette is necessarily or selectively required for the notebook computer. In the case that the floppy disk drive is mounted within the notebook computer, the floppy disk drive is a relatively large distance away from the controller, thereby causing inaccurate communication of the signals therebetween due to interference or external noise. The inaccurate signals may cause a malfunction of the floppy disk drive or may corrupt data recorded on the diskette.

The following patents each discloses features in common with the present invention: U.S. Pat. No. 5,781,028 to Decuir, entitled System And Method For A Switched Data Bus Termination, U.S. Pat. No. 5,781,029 to Baran, entitled Broadband Matching Technique For High Speed Logic And High Resolution Video Signals, U.S. Pat. No. 5,802,390 to Kashiwagi et al., entitled Data Bus Circuit And Method Of Charging Over Termination Resistor Of The Data Bus Circuit, U.S. Pat. No. 5,578,940 to Dillon et al., entitled Modular Bus With Signal Or Double Parallel Termination, U.S. Pat. No. 5,594,370 to Nguyen et al., entitled High Performance Backplane Driver Circuit, U.S. Pat. No. 5,528,167 to Samela et al., entitled Combination Of Terminator Apparatus Enhancements, U.S. Pat. No. 5,553,250 to Miyagawa et al., entitled Bus Terminating Circuit, U.S. Pat. No. 5,313,595 to Lewis et al., entitled Automatic Signal Termination System For A Computer Bus, U.S. Pat. No. 5,422,580 to Mandel et al., entitled Switchable Active Termination For SCSI Peripheral Devices, U.S. Pat. No. 5,399,926 to Adams et al., entitled Connected Processing Systems Including Mutual Power Off And Signal Path Disconnect Detection, and U.S. Pat. No. 5,239,559 to Brach et al., entitled Terminator Method And Apparatus.

SUMMARY OF THE INVENTION

It is an object of the present invention to provide a notebook computer for exactly transmitting signals between a controller and a floppy disk drive to stably operate the floppy disk drive.

Accordingly, to achieve the above object of the present invention, a notebook computer having a floppy disk drive for writing or reading information to or from a floppy disk according to predetermined control signals, comprises: a motherboard having a controller for generating control signals for controlling reading and writing data from and to the floppy disk drive, the controller being mounted on the motherboard; the floppy disk drive driving the floppy disk according to the control signals transmitted from the controller; and a connection unit for transmitting the control signals and power supply potentials from the controller to the floppy disk drive, the connection unit being physically and electrically disposed between the motherboard and the floppy disk drive; and the connection unit comprising a pull-up device disposed between terminals connected to the control signals and the power supply potentials.

The control signals connected to the pull-up device include at least one signal selected from the group consisting of a signal for turning on/off the floppy disk drive, a signal for selecting a kind of the floppy disk operating in the floppy disk drive, a signal for operating a motor of the floppy disk drive, a signal for selecting a floppy disk track, a signal for storing data in the floppy disk and a signal for selecting a side of a record medium of the floppy disk to be used with a read/write head.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 6A through 6D are graphs illustrating effects according to the present invention.

DESCRIPTION OF THE PREFERRED EMBODIMENT

Figure 1:
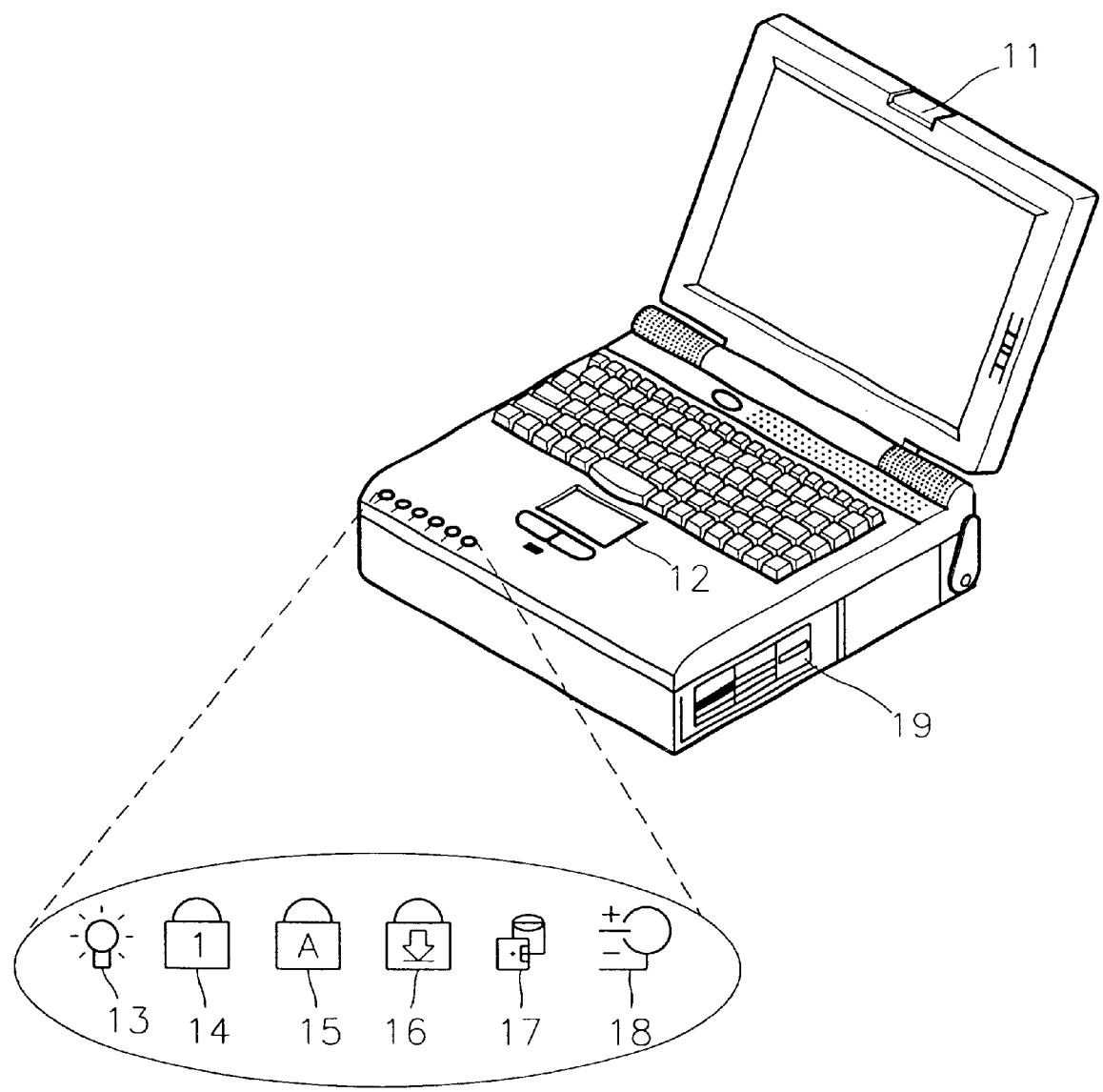
FIG. 1 shows a structure of a notebook computer.

FIG. 1 shows a notebook computer.

In general, a notebook computer includes a latch 11, a touch pad mouse 12, a power supply indicator 13, a Num Lock key indicator 14, Caps Lock key indicator 15, Scroll Lock key indicator 16, an indicator for indicating of the operation of a hard disk drive or a floppy disk drive 17, a battery charge indicator 18, and a slot 19 in which a floppy disk is inserted.

Figure 2:
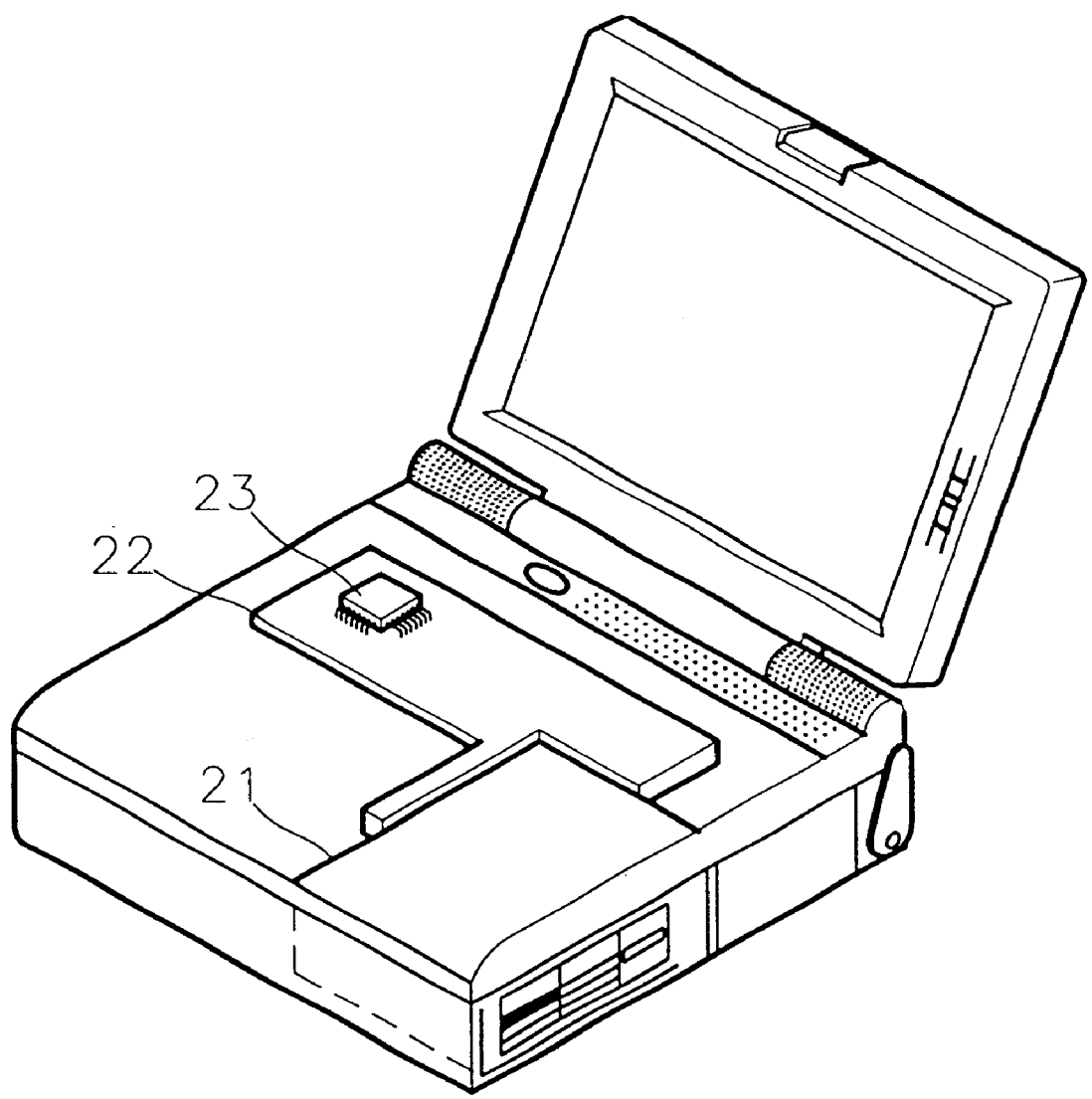
FIG. 2 shows a structure of an inner body of the notebook computer of FIG. 1.

FIG. 2 shows a structure of the inner body of a notebook computer. The body includes a floppy disk drive 21, a controller 23 for operating the floppy disk drive and a motherboard 22 on which a processor and a memory are mounted. The floppy disk drive 21 and the motherboard 22 are connected by a connector to communicate signals between the drive 21 and the controller 23.

The floppy disk drive 21 for reading and writing information to and from the diskette is necessarily or selectively required for the notebook computer. In the case that the floppy disk drive 21 is mounted within the notebook computer, the floppy disk drive 21 is a relatively large distance away from the controller 23, thereby causing inaccurate communication of the signals therebetween due to interference or external noise. The inaccurate signals may cause a malfunction of the floppy disk drive 21 or may corrupt data recorded on the diskette.

Figure 3:
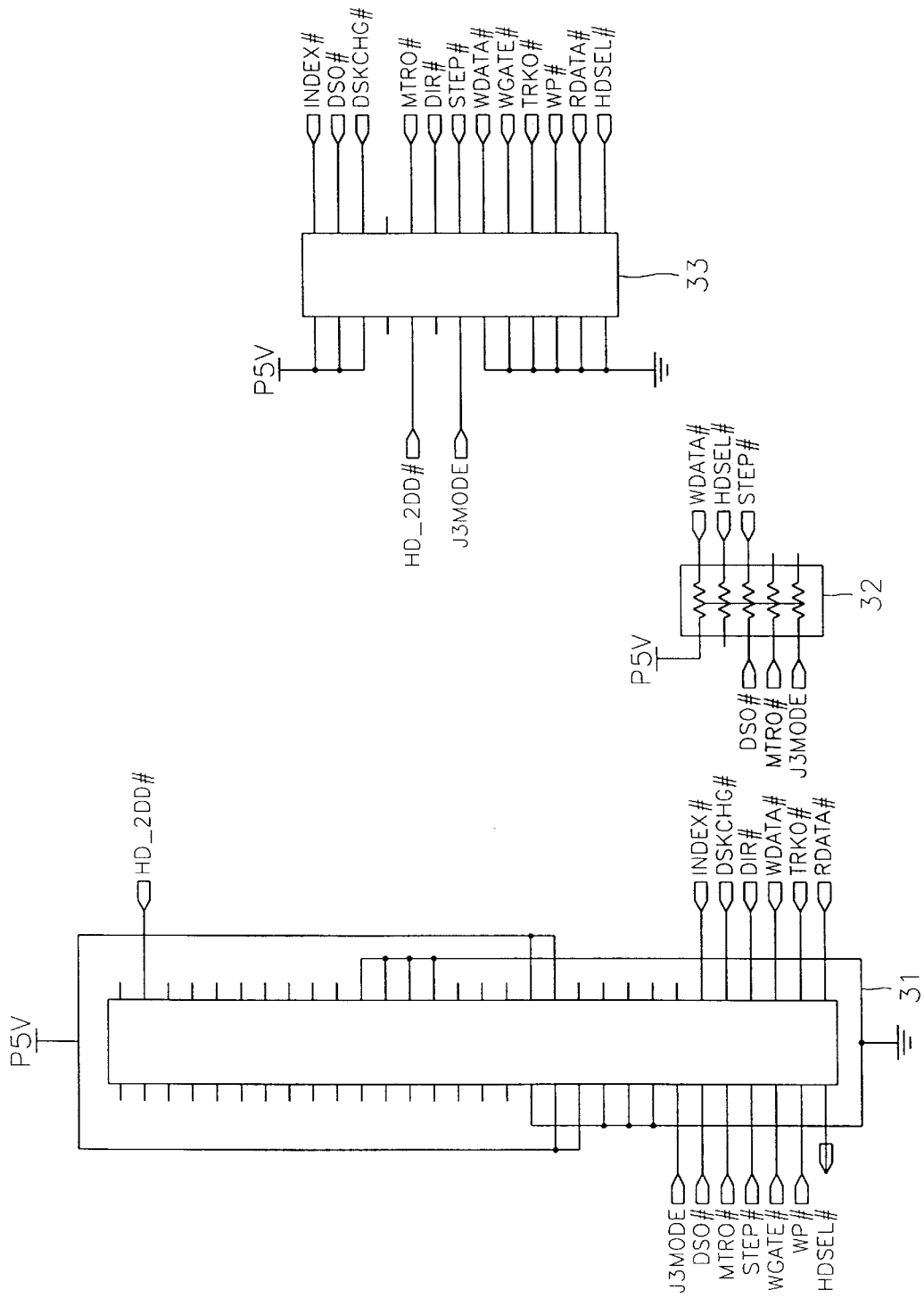
FIG. 3 shows the components related to the control of a floppy disk drive in a notebook computer according to the present invention.

Referring to FIG. 3, reference numeral 31 indicates a connector connected to a motherboard having a controller which generates a control signal for controlling read and write operations of data from and to a floppy disk drive, reference numeral 33 indicates a connector connected to the floppy disk drive for receiving the control signal of the controller to drive a floppy disk, and reference numeral 32 indicates a circuit having a predetermined pull-up device, which is coupled between a terminal connected to the control signal and a high potential level power supply when the signals of the connector 31 are transmitted to the connector 33.

The pull-up circuit 32 includes resistors connected between terminals of DSO#, MTRO#, STEP#, WDATA#, HDSEL# and J3MODE signals which are included in signals to be transmitted from the connector 31 to the connector 33 and a terminal of a +5V power supply.

Figure 4:
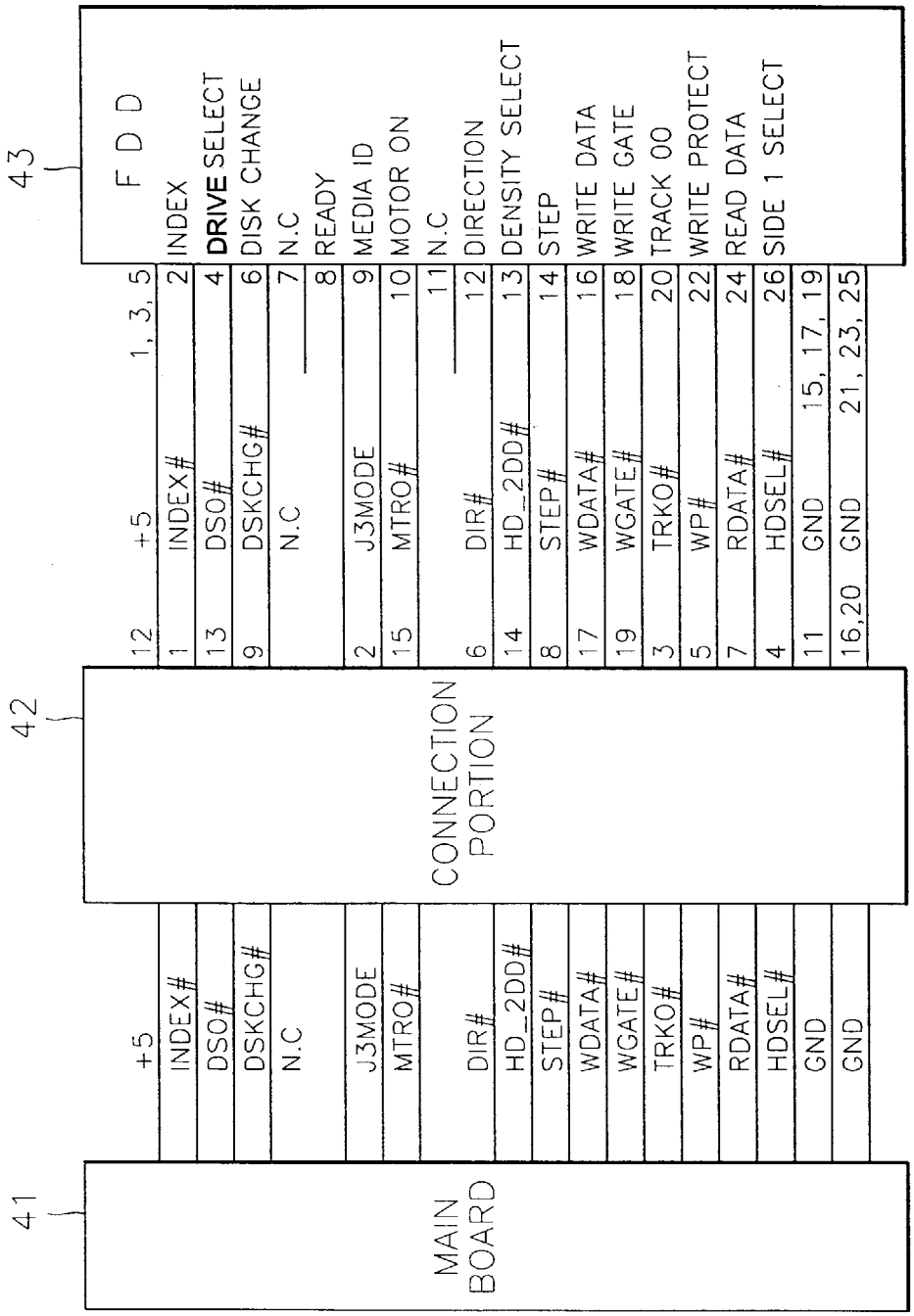
FIG. 4 shows the interconnection of the devices of FIG. 3.

The control signals shown in FIG. 3, which are generated by the controller to drive the floppy disk drive, are described in detail referring to FIG. 4.

Referring to FIG. 4, control signals are transmitted from a connector 41 of a motherboard to a connector 43 of the floppy disk drive through a connection portion 42 including a pull-up device.

The functions of each signal are as follows. That is, INDEX# is a signal for reading/writing data from/to the diskette, DSO# is a signal for operating the disk drive, such as turning on/off a motor of the floppy disk drive, setting read/write of the diskette or turning on/off a drive indicating lamp, DSKCHG# is a signal used for inserting or ejecting the diskette into or out of the drive, READY is a signal for checking whether the drive can be used, J3MODE is a signal for selecting a kind of the floppy disk operating in the floppy disk drive, e.g., 1.2 MB/1.44 MB/1.6 MB/2.0 MB, MTRO# is a signal for operating the motor of the floppy disk drive, DIR# is a signal for selecting a transmission or receiving direction of data between the drive and the motherboard, and HD_2DD# is a signal for selecting a kind of diskette, e.g., 2DD or 2HD. Also, STEP# is a signal for selecting a floppy disk track using the floppy disk drive, WDATA# is a signal used for storing data in the diskette using the floppy disk drive, WGATE# is a signal for giving authority capable of storing data in the diskette using the floppy disk drive, TRKO# is a signal for recognizing a star track of the floppy disk at initialization of the drive, WP# is a signal used for not storing the data on the diskette, i.e., for protecting the data on the diskette, RDATA# is a signal for reading the data from the diskette using the floppy disk drive, and HDSEL# is a signal for selecting a side of a record medium of the diskette by a head HEAD 0/1. A +5V signal line is a power supply line of a main power supply level, and a GND signal line is a power supply line of a ground level.

Here, the DSO#, the MTRO#, the STEP#, the WDATA#, the HDSEL# and the J#MODE# signals are liable to be particularly affected by noise among the signals transmitted from the main board 41 to the floppy disk drive 43. Thus, pull-up resistors of 10 KΩ connect the above signal lines to the high potential level power supply of +5V in the connection portion 42, so that a noise margin of a signal increases and a fan-out is enhanced, to thereby make current flowing to the drive sufficient.

Figure 5:
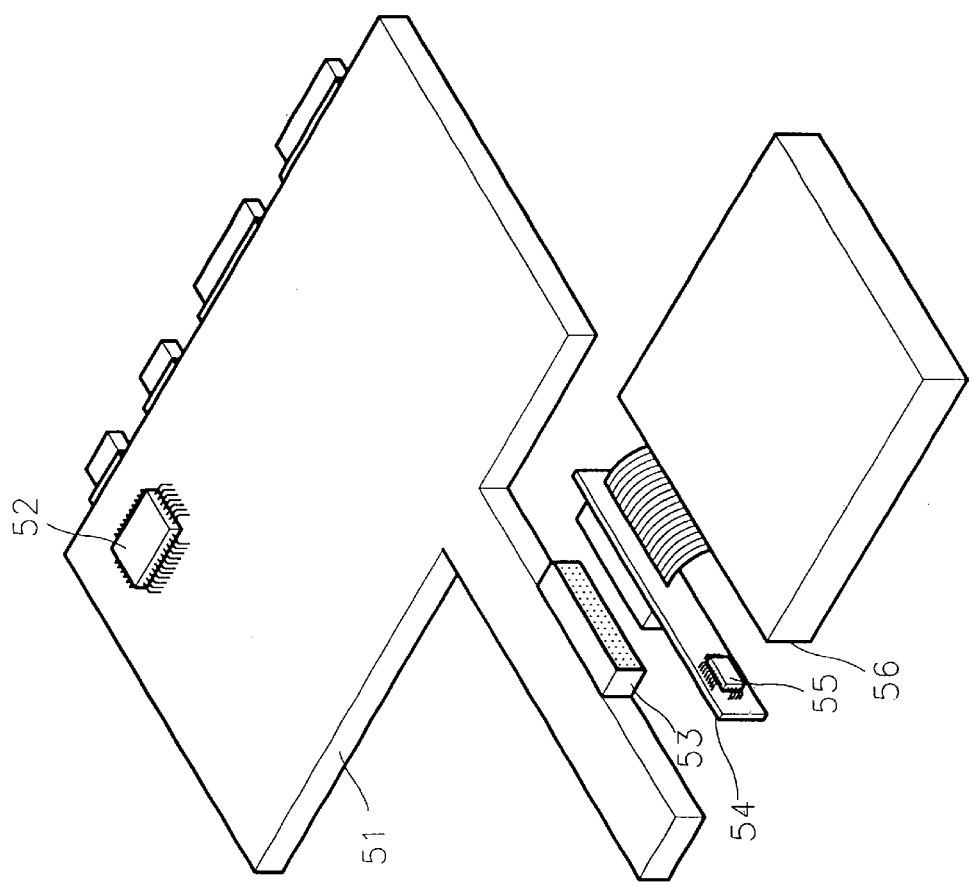
FIG. 5 shows a connection between inner components in the notebook computer according to the present invention.

Referring to FIG. 5, a controller 52 for controlling the drive is mounted on a motherboard 51, and floppy disk drive 56 receives signals transmitted from the controller 52 by connection of a connector 53 of the motherboard 51 to a connector 54 of the drive. Here, a pull-up resistance device 55 is located in the connector 54 of the drive.

Figure 6A:
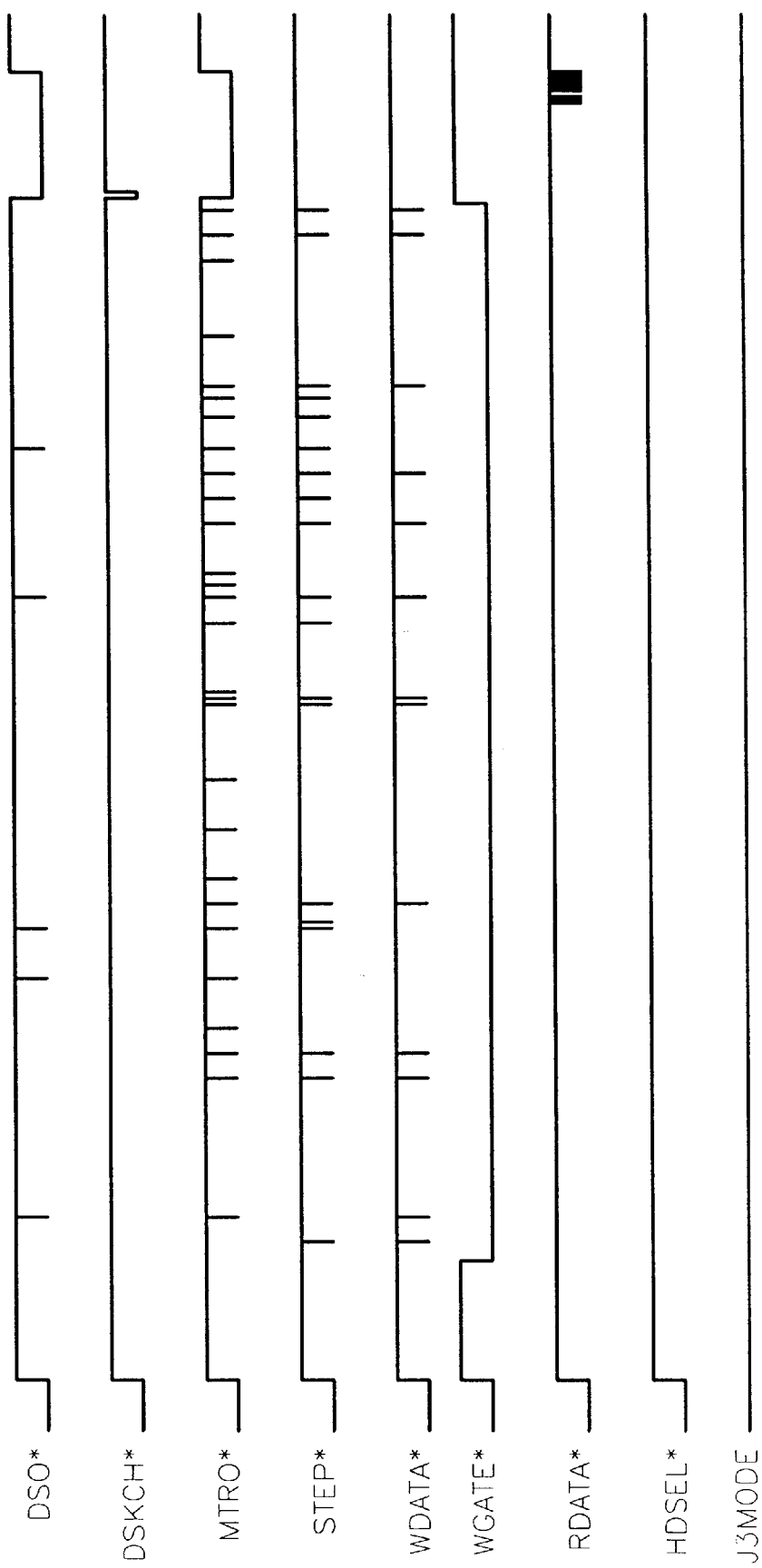
Figure 6C:
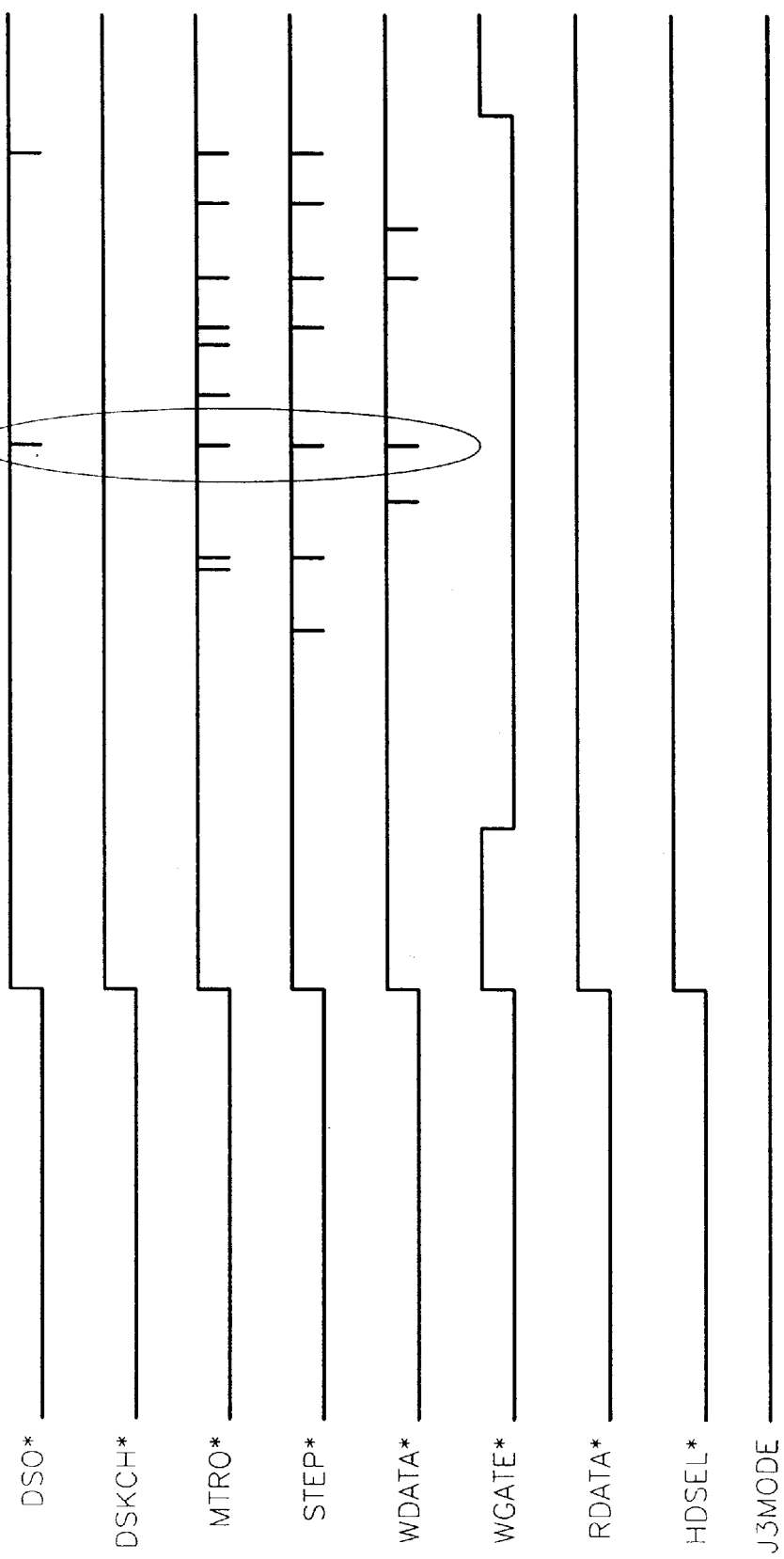

FIGS. 6A and 6C show waveforms of signals transmitted to the drive in a notebook computer. Control signals are contaminated by unexpected noise signals. FIG. 6D shows 500 times enlarged waveforms of a predetermined portion of the waveforms of FIG. 6C. A width of the noise signal indicates approximately 1.6 msec. At this time, the data of the diskette may be corrupted. However, FIG. 6B shows waveforms of signals of a notebook computer transmitted to the drive according to the present invention. It is shown that control signals without noise signals are transmitted.

According to the notebook computer having a floppy disk drive of the present invention, the pull-up device is implemented to a signal line between the controller and the floppy disk drive, to thereby increase a noise margin of the control signal and cause sufficient current to flow to the drive. Accordingly, signals generated by the controller for controlling a drive are transmitted to the floppy disk drive without noise, and thus the floppy disk drive can stably operate.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A notebook computer having a floppy disk drive for writing or reading information to or from a floppy disk according to predetermined control signals, comprising:

a motherboard having a controller for generating control signals for controlling reading and writing data from and to the floppy disk drive, the controller being mounted on the motherboard;

the floppy disk drive driving the floppy disk according to the control signals transmitted from the controller; and a connection unit for transmitting the control signals and power supply potentials from the controller to the floppy disk drive, the connection unit being physically and electrically disposed between the motherboard and the floppy disk drive;

the connection unit comprising a pull-up device disposed between terminals connected to the control signals and one of the power supply potentials.

2. The notebook computer of claim 1, the connection unit comprising a connector connected to the motherboard and a connector connected to the floppy disk drive, the pull-up device being located in the connector connected to the floppy disk drive.

3. The notebook computer of claim 1, the pull-up device comprising a resistor having a predetermined resistance.

4. The notebook computer of claim 2, the pull-up device comprising a resistor having a predetermined resistance.

5. The notebook computer of claim 1, the pull-up device comprising a resistor of 10 KΩ connected to a power supply potential of +5V.

6. The notebook computer of claim 1, the control signals connected to the pull-up device comprising at least one signal selected from the group consisting of:

a signal for turning on/off the floppy disk drive;

a signal for selecting a kind of the floppy disk operating in the floppy disk drive; and a signal for operating a motor of the floppy disk drive.

7. The notebook computer of claim 2, the control signals connected to the pull-up device comprising at least one signal selected from the group consisting of:

a signal for turning on/off the floppy disk drive;

a signal for selecting a kind of the floppy disk operating in the floppy disk drive; and a signal for operating a motor of the floppy disk drive.

8. The notebook computer of claim 1, the control signals connected to the pull up device comprising at least one signal selected from the group consisting of:

a signal for selecting a floppy disk track;

a signal for storing data in the floppy disk; and a signal for selecting a side of a record medium of the floppy disk to be used with a read/write head.

9. The notebook computer of claim 2, the control signals connected to the pull up device comprising at least one signal selected from the group consisting of:

a signal for selecting a floppy disk track;

a signal for storing data in the floppy disk; and a signal for selecting a side of a record medium of the floppy disk to be used with a read/write head.

10. The notebook computer of claim 3, the control signals connected to the pull-up device comprising at least one signal selected from the group consisting of:

a signal for turning on/off the floppy disk drive;

a signal for selecting a kind of the floppy disk operating in the floppy disk drive; and a signal for operating a motor of the floppy disk drive.

11. The notebook computer of claim 4, the control signals connected to the pull-up device comprising at least one signal selected from the group consisting of:

a signal for turning on/off the floppy disk drive;

a signal for selecting a kind of the floppy disk operating in the floppy disk drive; and a signal for operating a motor of the floppy disk drive.

12. The notebook computer of claim 5, the control signals connected to the pull-up device comprising at least one signal selected from the group consisting of:

a signal for turning on/off the floppy disk drive;

a signal for selecting a kind of the floppy disk operating in the floppy disk drive; and a signal for operating a motor of the floppy disk drive.

13. The notebook computer of claim 3, the control signals connected to the pull up device comprising at least one signal selected from the group consisting of:

a signal for selecting a floppy disk track;

a signal for storing data in the floppy disk; and a signal for selecting a side of a record medium of the floppy disk to be used with a read/write head.

14. The notebook computer of claim 4, the control signals connected to the pull up device comprising at least one signal selected from the group consisting of:

a signal for selecting a floppy disk track;

a signal for storing data in the floppy disk; and a signal for selecting a side of a record medium of the floppy disk to be used with a read/write head.

15. The notebook computer of claim 5, the control signals connected to the pull up device comprising at least one signal selected from the group consisting of:

a signal for selecting a floppy disk track;

a signal for storing data in the floppy disk; and is a signal for selecting a side of a record medium of the floppy disk to be used with a read/write head.

16. A notebook computer having a floppy disk drive for writing or reading information to or from a floppy disk according to predetermined control signals, comprising:

a motherboard having a controller for generating control signals for controlling reading and writing data from and to the floppy disk drive, the controller being mounted on the motherboard;

the floppy disk drive driving the floppy disk according to the control signals transmitted from the controller; and a connection unit for transmitting the control signals and power supply potentials from the controller to the floppy disk drive, the connection unit being physically and electrically disposed between the motherboard and the floppy disk drive;

the connection unit comprising a pull-up device disposed between terminals connected to the control signals and one of the power supply potentials and a connector connected to the motherboard and a connector connected to the floppy disk drive, the pull-up device being located in the connector connected to the floppy disk drive, wherein the control signals connected to the pull-up device comprising at least one signal selected from the group consisting of:

a signal for turning on/off the floppy disk drive;

a signal for selecting a kind of the floppy disk operating in the floppy disk drive; and a signal for operating a motor of the floppy disk drive.

17. A notebook computer having a floppy disk drive for writing or reading information to or from a floppy disk according to predetermined control signals, comprising:

a motherboard having a controller for generating control signals for controlling reading and writing data from and to the floppy disk drive, the controller being mounted on the motherboard;

the floppy disk drive driving the floppy disk according to the control signals transmitted from the controller; and a connection unit for transmitting the control signals and power supply potentials from the controller to the floppy disk drive, the connection unit being physically and electrically disposed between the motherboard and the floppy disk drive;

the connection unit comprising a pull-up device disposed between terminals connected to the control signals and one of the power supply potentials and a connector connected to the motherboard and a connector connected to the floppy disk drive, the pull-up device being located in the connector connected to the floppy disk drive, wherein the control signals connected to the pull-up device comprising at least one signal selected from the group consisting of:

a signal for selecting a floppy disk track;

a signal for storing data in the floppy disk; and a signal for selecting a side of a record medium of the floppy disk to be used with a read/write head.

* * * * *